Figure 1:
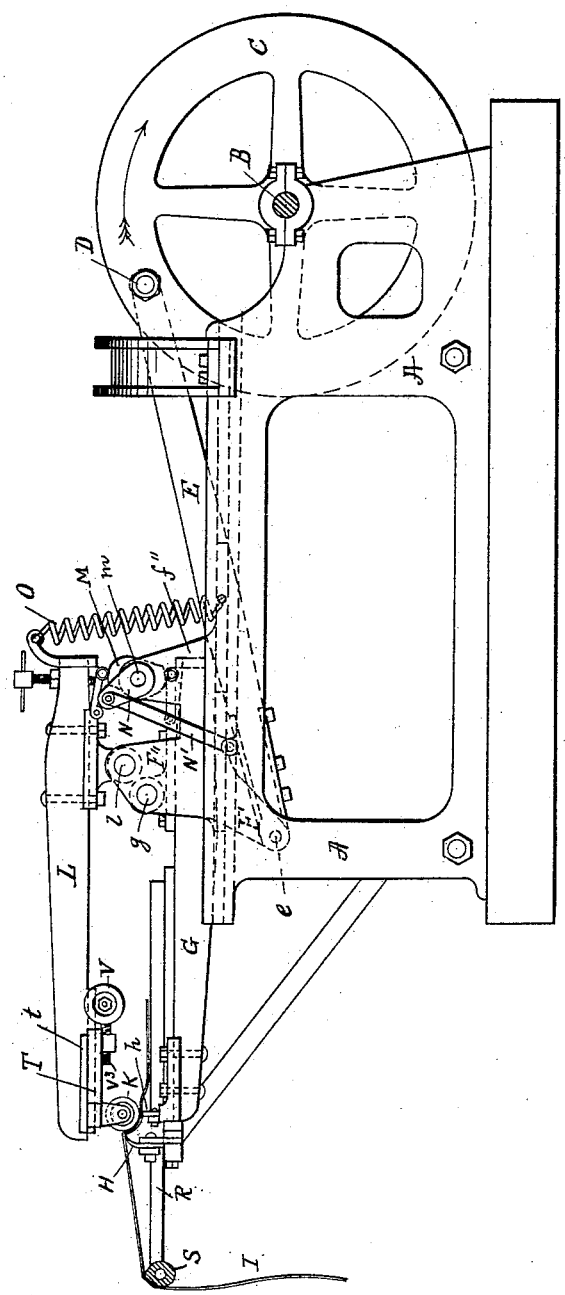

No. 620,545. Patented Feb. 28, 1899.
G. W. GLAZIER.
MACHINE FOR SOFTENING HIDES OR SKINS.
(Application filed Sept. 23, 1898.)

(No Model.) 2 Sheets—Sheet 1.

Witnesses:
Karl A. Andren
Francis A. Perry

Inventor:
George W. Glazier.
by Andren
his atty.

No. 620,545. Patented Feb. 28, 1899.
G. W. GLAZIER.
MACHINE FOR SOFTENING HIDES OR SKINS.
(Application filed Sept. 23, 1898.)
(No Model.) 2 Sheets—Sheet 2.
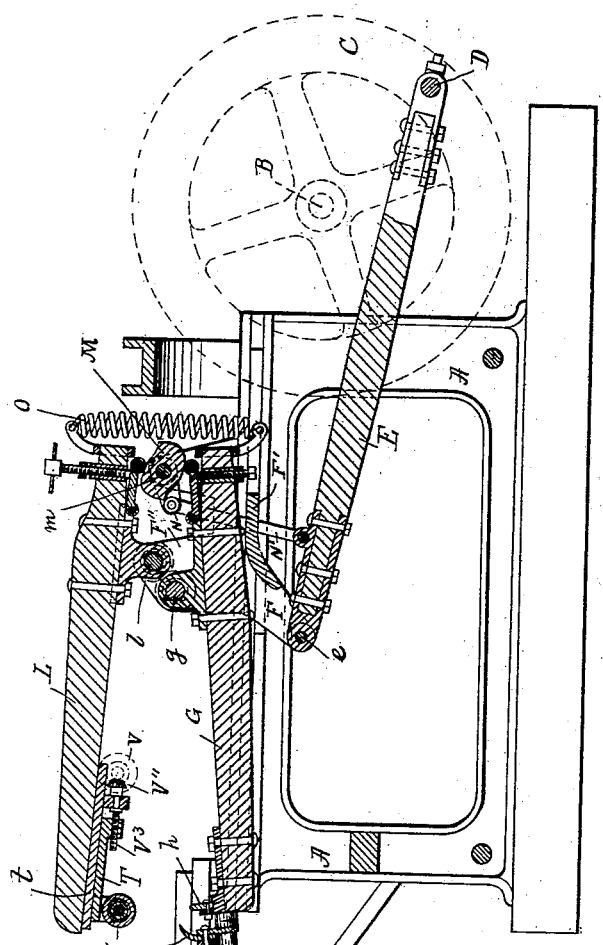
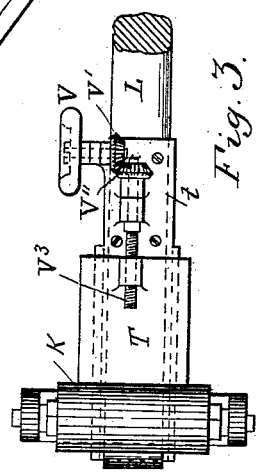
Witnesses.
Karl A. Andrén
Frances A. Peary.
Inventor:
George W. Glazier
by Alban Andrén
his atty.

UNITED STATES PATENT OFFICE.

GEORGE W. GLAZIER, OF SALEM, MASSACHUSETTS, ASSIGNOR OF ONE-HALF TO CHARLES C. BRIGGS, OF SAME PLACE.

MACHINE FOR SOFTENING HIDES OR SKINS.

SPECIFICATION forming part of Letters Patent No. 620,545, dated February 28, 1899.

Application filed September 23, 1898. Serial No. 691,692. (No model.)

*To all whom it may concern:*

Be it known that I, GEORGE W. GLAZIER, a citizen of the United States, residing at Salem, in the county of Essex and State of Massachusetts, have invented new and useful Improvements in Machines for Softening Hides or Skins, of which the following is a specification.

This invention relates to improvements on the patent granted October 30, 1888, No. 392,141, to Nicolas Weber for a machine for softening hides or skins; and it consists in improved and simplified mechanism for opening and closing the hide or skin gripping devices, as will hereinafter be more fully shown and described, reference being had to the accompanying drawings, wherein—

Figure 1 represents a side elevation of the improved machine, showing the yielding roll and the scraper as being closed against opposite sides of the hide or skin during the backward movement of the gripping device. Fig. 2 represents a longitudinal section of the machine, showing the gripping mechanism expanded during its forward movement; and Fig. 3 represents a detail bottom plan view of the forward end of the roller-carrying lever and means for adjusting said roller relative to the scraper during the operation of the machine.

Similar letters refer to similar parts wherever they occur on the different parts of the drawings.

In the drawings, A represents the frame of the machine, in bearings in which is journaled the rotary driving-shaft B, to which is attached the balance-wheel C, having a crank D, to which is pivotally connected the link or connecting-rod E, the forward end of which is pivotally connected at e to a bracket F, having made integral with it a carrier F', which is adapted to move longitudinally in suitable guides in the frame A, as shown.

Integral with the carrier F' is made an upwardly-projecting bracket F'' in a manner similar to that shown and described in the Weber patent above mentioned.

G is the scraper-carrying lever, which is pivoted at g to the bracket F''', and it is provided at its forward end with a preferably curved blade or scraper H, adapted to remove the surplus matter from the flesh side of a hide or skin I, interposed between it and the elastic roller K, which is journaled on the under side of the forward end of a lever L, pivoted at l to the bracket F''', as shown.

Back of the scraper H is secured to the lever G a blunt blade h, serving to remove wrinkles from the hide or skin in advance of the point where the scraping-blade acts in a manner similar to that shown and described in the above-mentioned patent.

It will be noticed that a longitudinal forward-and-back movement is imparted by the crank D and connecting-rod E to the carrier F', its bracket F''', and the levers G L, pivoted to the latter.

The mechanism for automatically holding the roller K against the scrapers H h and the hide or skin interposed between such roller and scrapers during the backward movement of the levers G L is constructed as follows: m is a rock-shaft journaled in a bracket f''', made integral with the slide F' and bracket F''', and to said rock-shaft is secured a cam M, adapted when rocked during the backward movement of the levers G L to come in contact with the rear portions of said levers, (or adjustable plates secured thereto,) by which the forward ends of said levers are closed sufficiently to press the skin or hide with a proper friction between the roller K and scrapers H h.

To the rock-shaft m are secured cranks N N, to which are pivotally connected links or rods N' N', the lower ends of which are pivotally connected to the lever E, and it will thus be seen that a rocking motion is imparted to the cam M directly from the connecting-rod E during the rotation of the shaft B for the purpose stated.

During the forward motion of the carrier F' and the levers G L, pivoted to it, the cam M ceases to act on said levers, and they are then automatically expanded, as shown in Fig. 2, by the influence of a spring or springs O, connected to the rear ends of said levers G L, as shown in Figs. 1 and 2.

R represents the work-supporting table secured in a suitable manner to the frame A, and to its outer end is secured a rubber cushion or bar S to enable the operator to better hold the skin during the scraping action by bearing the same against said cushion or roll with his body in a manner like that shown and described in the Weber patent aforesaid.

In machines of this kind it is very desirable to enable the operator to adjust the roller K relative to the scraper H during the operation of the machine, so as to compensate for variations in the thickness of the hide or skin that is being operated on, and for this purpose I journal the roller K in a plate or bracket T, which is longitudinally adjustable on the lever L or a plate $t$, attached thereto, as shown in the drawings.

In practice I prefer to adjust the position of the roller K by means of a hand-wheel V, attached to a spindle journaled in the plate T and provided with a bevel-gear V', meshing in a similar gear V'', attached to a screw-threaded spindle $V^3$, journaled in the plate $t$ and working in a screw-threaded perforation on the bracket or slide T, as shown in detail in Fig. 3. It will thus be seen that the operator can readily adjust the position of the roller K relative to the scraper H simply by turning the hand-wheel V during the operation of the machine, as may be required, according to variations in the thickness of the hide or skin operated upon.

I prefer to adjust the roller K by means of the hand-wheel, gears, and screw, as described; but I wish to state that I do not confine myself to this exact arrangement, as equivalents may be used without departing from the essence of my invention.

What I wish to secure by Letters Patent and claim is—

1. In a machine for softening hides or skins in combination, a rotary crank or wheel, a reciprocating carrier, a connecting-rod between said parts, a pair of spring-pressed levers pivoted to said carrier, a rock-shaft intermediate between said levers, a cam and crank secured to said rock-shaft, a link connecting said crank and connecting-rod and a roller and scraping device attached to the forward ends of said levers, substantially as and for the purpose set forth.

2. In a machine for softening skins or hides, in combination, a reciprocating carrier, a pair of scraper-levers pivotally connected to said carrier, a spring for expanding said levers and a cam for closing said levers said cam being actuated by a link connected to the connecting-rod that imparts a reciprocating motion to the carrier, substantially as and for the purpose set forth.

In testimony whereof I have hereunto set my hand in presence of two subscribing witnesses.

GEORGE W. GLAZIER.

Witnesses:
ALBAN ANDRÉN,
KARL A. ANDRÉN.